United States Patent
Oshida et al.

(10) Patent No.: US 9,931,953 B2
(45) Date of Patent: Apr. 3, 2018

(54) NON-CONTACT POWER SUPPLY METHOD AND NON-CONTACT POWER SUPPLY SYSTEM

(71) Applicant: Renesas Electronics Corporation, Kanagawa (JP)

(72) Inventors: Daisuke Oshida, Kanagawa (JP); Shigeru Furuta, Kanagawa (JP)

(73) Assignee: RENESAS ELECTRONIC CORPORATION, Tokyo (JP)

( * ) Notice: Subject to any disclaimer, the term of this patent is extended or adjusted under 35 U.S.C. 154(b) by 320 days.

(21) Appl. No.: 14/619,198

(22) Filed: Feb. 11, 2015

(65) Prior Publication Data
US 2015/0239355 A1  Aug. 27, 2015

(30) Foreign Application Priority Data
Feb. 21, 2014 (JP) .................................. 2014-031486

(51) Int. Cl.
*H02J 7/00* (2006.01)
*B60L 11/18* (2006.01)
(Continued)

(52) U.S. Cl.
CPC ......... *B60L 11/182* (2013.01); *B60L 11/1824* (2013.01); *B60L 11/1844* (2013.01);
(Continued)

(58) Field of Classification Search
CPC ...................................................... H02J 7/025
(Continued)

(56) References Cited

U.S. PATENT DOCUMENTS

2007/0182367 A1* 8/2007 Partovi .................. H01F 5/003
320/108
2012/0098330 A1   4/2012 Ichikawa et al.
(Continued)

FOREIGN PATENT DOCUMENTS

JP    2011-155775 A    8/2011
JP    2012-173902 A    9/2012
(Continued)

OTHER PUBLICATIONS

Extended European Search Report received in corresponding European Application No. 15152100.2 dated Aug. 24, 2015.
Japanese Office Action received in corresponding Japanese Application No. 2014-031486 dated Aug. 29, 2017.

*Primary Examiner* — Edward Tso
*Assistant Examiner* — Ahmed Omar
(74) *Attorney, Agent, or Firm* — Mattingly & Malur, PC

(57) ABSTRACT

It is intended to provide a safe non-contact charging environment that enables finding an electronic appliance that remains left in a vehicle before start of charging and preventing trouble that an electronic appliance breaks down by electromagnetic waves generated during charging by means of electromagnetic coupling. A process of checking to see that an electronic appliance remains left inside a vehicle, based on wireless communication information emitted by the electronic appliance left inside the vehicle is performed in advance. When it has been detected that an electronic appliance remains left, a charging current value is controlled according to an allowable current of the detected electronic appliance or an alert is generated to notify that the electronic appliance remains left.

14 Claims, 13 Drawing Sheets

(51) Int. Cl.
*G08B 21/24* (2006.01)
*H04B 5/00* (2006.01)
*H04W 4/04* (2009.01)
*H04L 29/08* (2006.01)

(52) U.S. Cl.
CPC .......... *B60L 11/1846* (2013.01); *G08B 21/24* (2013.01); *B60L 2200/12* (2013.01); *B60L 2210/30* (2013.01); *B60L 2230/16* (2013.01); *B60L 2240/70* (2013.01); *B60L 2250/10* (2013.01); *H04B 5/0037* (2013.01); *H04L 67/12* (2013.01); *H04W 4/046* (2013.01); *Y02E 60/721* (2013.01); *Y02T 10/7005* (2013.01); *Y02T 10/7088* (2013.01); *Y02T 10/7241* (2013.01); *Y02T 10/7291* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(58) Field of Classification Search
USPC ....................................................... 320/108
See application file for complete search history.

(56) References Cited

U.S. PATENT DOCUMENTS

| | | | |
|---|---|---|---|
| 2013/0154819 A1* | 6/2013 | Stefanovski | B60R 25/24 340/457 |
| 2013/0249682 A1 | 9/2013 | Van Wiemeersch et al. | |
| 2013/0271275 A1 | 10/2013 | Schalk | |
| 2013/0278415 A1* | 10/2013 | Morgan, Jr. | H04W 4/046 340/539.13 |
| 2014/0011482 A1 | 1/2014 | Le et al. | |
| 2014/0021908 A1* | 1/2014 | McCool | B60L 11/182 320/108 |
| 2014/0111153 A1* | 4/2014 | Kwon | H02J 7/025 320/108 |

FOREIGN PATENT DOCUMENTS

| | | |
|---|---|---|
| JP | 2013-172501 | 9/2013 |
| JP | 2013-192281 A | 9/2013 |
| WO | 2011/001524 | 1/2011 |
| WO | 2012/115649 A1 | 8/2012 |
| WO | 2013/142866 A1 | 9/2013 |

* cited by examiner

FIG. 6

MESSAGE THAT IS TRANSMITTED BY ELECTRONIC APPLIANCE

| HEADER INFORMATION | DEVICE INFORMATION (MAX. ALLOWABLE CURRENT VALUE) |
|---|---|

FIG. 7

MESSAGE THAT IS TRANSMITTED BY VEHICLE

| HEADER INFORMATION | (DEVICE INFORMATION) | MAX. ALLOWABLE CURRENT VALUE |
|---|---|---|

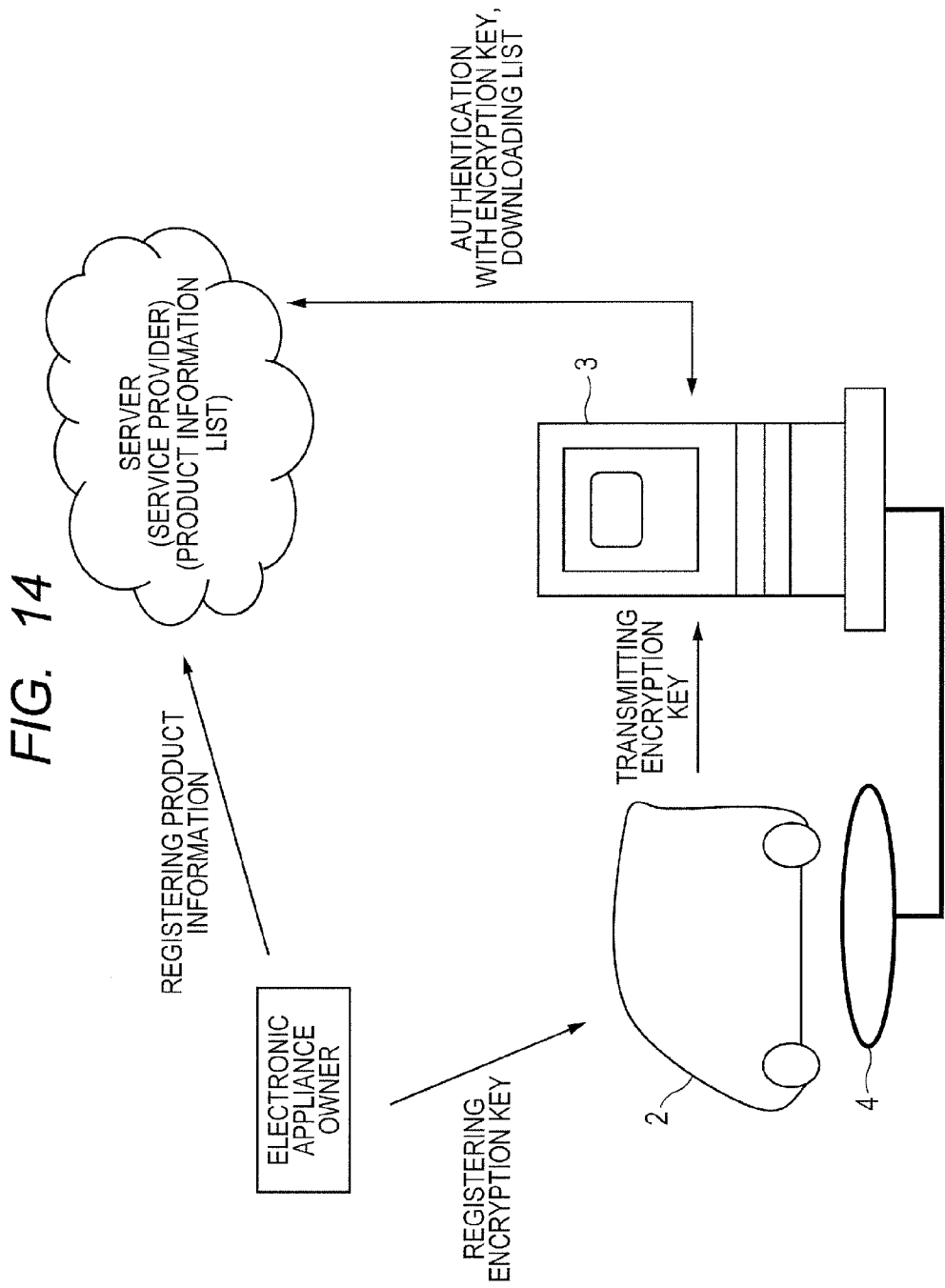

NON-CONTACT POWER SUPPLY METHOD AND NON-CONTACT POWER SUPPLY SYSTEM

CROSS-REFERENCE TO RELATED APPLICATIONS

The disclosure of Japanese Patent Application No. 2014-031486 filed on Feb. 21, 2014 including the specification, drawings and abstract is incorporated herein by reference in its entirety.

BACKGROUND

The present invention relates to a non-contact charging method and a non-contact charging system for carrying out electric power transmission to a vehicle in a contactless manner.

For electric vehicles such as electric-powered cars and hybrid cars, it is necessary to charge an in-vehicle electricity storage device from a power supply outside the vehicle. In this regard, a non-contact power supply method without using a cable draws attention as a method of supplying electric power to a vehicle from outside of the vehicle. As a non-contact power supply method, there is, e.g., a method by means of electromagnetic coupling (a method by means of electromagnetic induction, a method by means of electromagnetic waves, a resonance method, etc.). Patent Document 1 discloses a non-contact power supply system utilizing a resonance method.

Non-contact power supply to a vehicle is non-contact power supply of heavy current, unlike non-contact power supply of weak current which is performed for mobile terminals or the like. In the case of non-contact power supply of heavy current, electromagnetic waves that are generated during power supply operation have an influence on not only human body, but also various electric products. Investigating use cases in which non-contact power supply is practically applied reveals that there appears to be a possibility that the user of an electric vehicle starts charging, while leaving an electronic appliance such as a product of consumer electronics in the electric vehicle. If doing so, the electronic appliance left in the electric vehicle may be heated to high temperature by electromagnetic waves which are generated when electricity is charged to the electric vehicle and, eventually, there is a possibility that the electronic appliance fails.

In Patent Document 2, described is a technique that prevents efficiency of power supply from decreasing by an intervening foreign matter. According to this technique, before starting non-contact power supply, precharging is performed to detect whether or not a foreign matter is present between a power supply coil of a power supply device and a power receiving coil in the vehicle.

RELATED ART DOCUMENTS

Patent Documents

[Patent Document 1]
International Publication No. 2011/001524
[Patent Document 2]
Japanese Published Unexamined Patent Application No. 2013-172501

SUMMARY

In order to prevent an electronic appliance left in the electric vehicle from failing by electromagnetic waves during charging, the user has to check to make sure that an electronic appliance such as a product of consumer electronics is not present inside the electric vehicle at his or her initiative and start charging.

However, in this manner of checking, there is a possibility that an electronic appliance remains left in the electric vehicle because of insufficient checking or the like and reliability is low. Improvement in this point of view is not mentioned in any of Patent Documents 1 and 2. It is hoped for to build an environment where charging electricity to an electric vehicle is performed safely, avoiding such a situation.

The above and other problems and novel features will be apparent from the description in the present specification and the accompanying drawings.

A typical one of embodiments of the invention disclosed herein is summarized as follows.

A process of checking to see that an electronic appliance remains left inside a vehicle, based on wireless communication information emitted by the electronic appliance left inside the vehicle is performed in advance. When it has been detected that an electronic appliance remains left, a charging current value of charging is controlled according to an allowable current of the detected electronic appliance or an alert is generated to notify that the electronic appliance remains left.

Effect that will be achieved by a typical one of embodiments of the invention disclosed herein is briefly described below.

It is possible to provide a safe non-contact charging environment that enables finding an electronic appliance that remains left in a vehicle before start of charging and preventing trouble that an electronic appliance breaks down by electromagnetic waves generated during charging by means of electromagnetic coupling.

BRIEF DESCRIPTION OF THE DRAWINGS

FIG. 6 is an explanatory diagram illustrating wireless communication information that is output from an electronic appliance.

FIG. 7 is an explanatory diagram illustrating wireless communication information that is output from a vehicle.

FIG. 14 is an explanatory diagram illustrating a method for allowing a product information list to be downloaded through authentication using an encryption key.

DETAILED DESCRIPTION

1. General Outline of Embodiments

Figure 1:
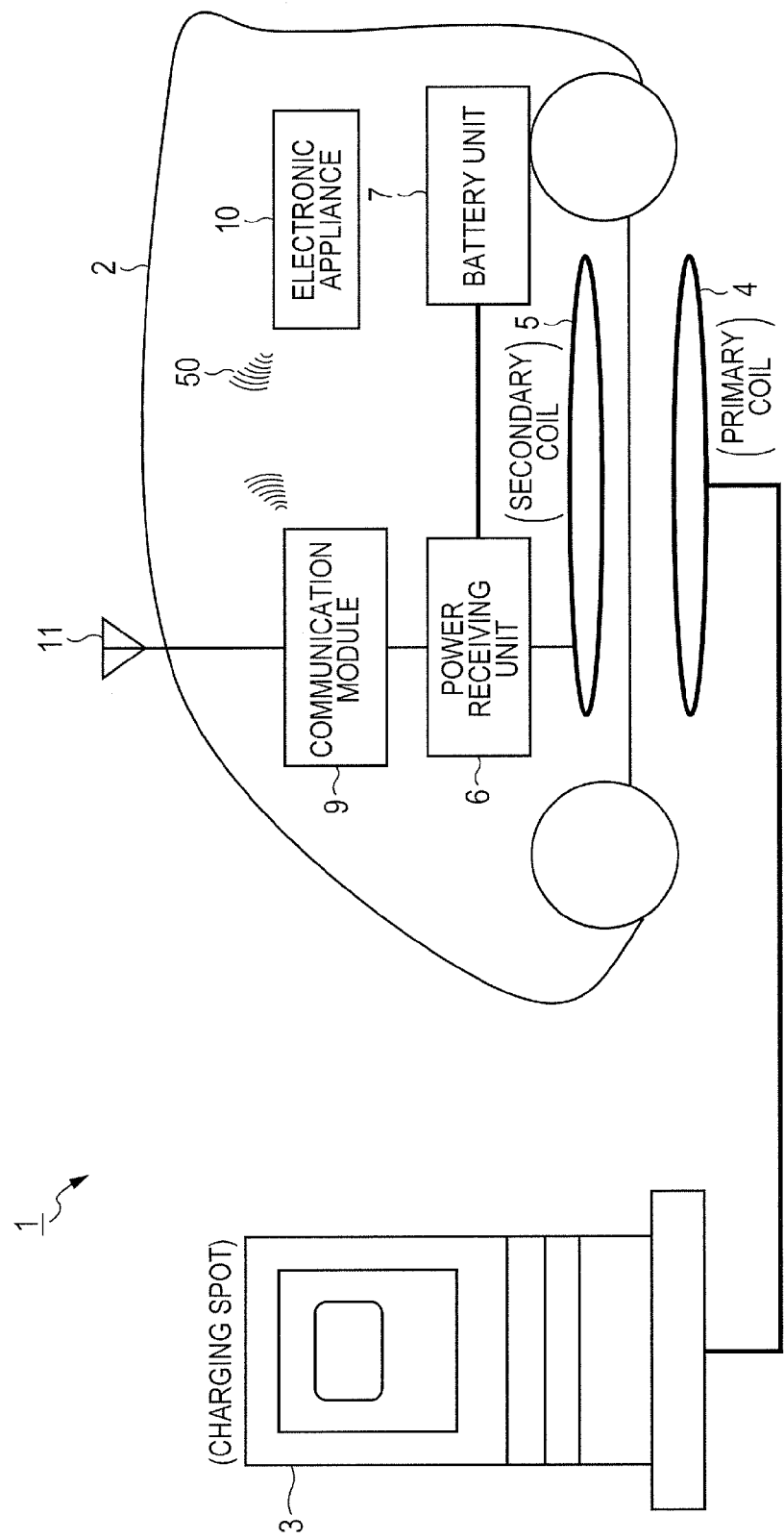
FIG. 1 is a block diagram depicting an example of a non-contact power supply system.

To begin with, embodiments of the present invention disclosed herein are outlined. In the following general description of embodiments, reference designators (numerals) in the drawings, which are given for referential purposes in parentheses, are only illustrative of elements that fall in the concepts of the components identified by the designators.

[1] <Power Supply Control According to an Allowable Current Value of an Electronic Appliance Left in a Vehicle>

A non-contact power supply method enables charging electricity to a vehicle by electromagnetically coupling a power receiving coil mounted in the vehicle to a power supply coil of a power supply device which is placed to an outside of the vehicle. This non-contact power supply method includes the following steps: a checking step of checking to see that an electronic appliance remains left inside the vehicle, based on wireless communication information emitted by the electronic appliance left inside the vehicle; and, when having detected that the electronic appliance remains left, a current control step of controlling a current value of power supply according to an allowable current value of the detected electronic appliance.

According to this aspect, before start of charging, an electronic appliance that remains left in a vehicle is found, based on wireless communication information emitted by the appliance, and a current value of power supply is controlled according to an allowable current value of the electronic appliance. Thus, it is possible to prevent breakdown of an electronic appliance by electromagnetic waves generated by electromagnetic coupling for power supply.

[2] <A Case in which Communication is Established Between an Electronic Appliance and an Access Point of a Vehicle>

In the above section [1], in a case where the vehicle is equipped with a function of serving as an access point for the electronic appliance to communicate with a wireless communication function of the electronic appliance, when communication is established between the electronic appliance and the access point of the vehicle, the checking step, is a process of receiving information gathered by the vehicle through the communication and checking to see that an electronic appliance remains left.

According to this aspect, under a communication environment where a vehicle serves as an access point for an electronic appliance, it is possible to detect that there is an electronic appliance left in a vehicle when initiating charging by making effective use of this communication environment.

[3] <A Case in which an Electronic Appliance is Activated by Precharging Power>

The checking step, as mentioned in section [1], is a process in which, before start of a charging operation, the power supply device performs precharging to a vehicle by means of electromagnetic coupling for a given period of time and an electronic appliance receiving electric power by electromagnetic waves generated at this time emits wireless communication information, based on which checking is performed to see that the electronic appliance remains left.

According to this aspect, even if an electronic appliance left in a vehicle is in a power-off state, the electric appliance is allowed to generate and emit wireless communication information by receiving electric power by electromagnetic waves generated by precharge. Thereby, checking can be performed to see that the electronic appliance remains left.

[4] <A Case in which the Power Supply Device Receives Wireless Communication Information Via a Wireless Communication Function of a Vehicle>

The checking step, as mentioned in the section [3], is a process in which an electronic appliance receiving electric power by the electromagnetic waves emits wireless communication information and the power supply device receives the wireless communication information via a wireless communication function of the vehicle and checks to see that an electronic appliance remains left.

According to this aspect, even if the transmission power of an electronic appliance to transmit wireless communication information is so weak that the power supply device cannot receive it directly, the power supply device can receive it via the wireless communication function of the vehicle.

[5] <A Case in which the Power Supply Device Directly Receives Wireless Communication Information>

The checking step, as mentioned in the section [3], is a process in which an electronic appliance receiving electric power by the electromagnetic waves emits wireless communication information and the power supply device directly receives the wireless communication information and checks to see that an electronic appliance remains left.

According to this aspect, there is no need for an unnecessary repeater, if the transmission power of an electronic appliance to transmit wireless communication information is strong enough for the power supply device to receive it directly.

[6] <A Case in which an Electronic Appliance is Activated to Output Wireless Communication Information by Beacon Inside a Vehicle>

The checking step, as mentioned in the section [1], is a process in which an electronic appliance, upon receiving a predefined beacon which is generated inside a vehicle, is activated and emits wireless communication information, based on which checking is performed to see that the electronic appliance remains left.

According to this aspect, even for an electronic appliance that is activated by receiving a predefined beacon, checking can be performed to see that the appliance remains left by using the appliance's communication function.

[7] <Wireless Communication Information Including an Allowable Current Value of the Electronic Appliance Itself>

The wireless communication information, as mentioned in the section [1], includes information of an allowable current value of the electronic appliance itself.

According to this aspect, it is very easy to obtain an allowable current value of an electronic appliance remaining left.

[8] <Obtaining an Allowable Current Value from ID Information of an Electronic Appliance Included in the Wireless Communication Information>

The wireless communication information, as mentioned in the section [1], includes ID information of the electronic appliance itself. The checking step obtains, from a vehicle, information of an allowable current value which is obtained by making reference to a database in which a mapping between ID of an electronic appliance and its allowable current value has been registered beforehand and searching for a match with the ID information included in the wireless communication information. The current control step controls a current value of power supply according to the allowable current value obtained from the vehicle.

According to this aspect, the use of the database, though requiring data registration into the database, can contribute reduction in the amount of information to transmit, as compared with a case in which an allowable current value is directly transmitted, included in wireless communication information.

[9] <Notifying that an Electronic Appliance Remains Left to the Vehicle>

A non-contact power supply method is the non-contact power supply method that enables charging electricity to a vehicle by electromagnetically coupling a power receiving coil mounted in the vehicle to a power supply coil of a power supply device which is placed to an outside of the vehicle. This method includes the following steps: a checking step of checking to see that an electronic appliance remains left inside the vehicle, based on wireless communication information emitted by the electronic appliance left inside the vehicle; and, when having detected that the electronic appliance remains left, a notification step of notifying that fact.

According to this aspect, before start of charging, an electronic appliance that remains left in a vehicle is found, based on wireless communication information emitted by the appliance, and it is notified to the vehicle user that an electronic appliance remains left. Thus, it is possible to positively prompt the vehicle user to retrieve the appliance and prevent breakdown of an electronic appliance by electromagnetic waves generated by electromagnetic coupling for power supply.

[10] <A Case in which Communication is Established Between an Electronic Appliance and an Access Point of a Vehicle>

In the section [9], in a case where the vehicle is equipped with a function of serving as an access point for the electronic appliance to communicate with a wireless communication function of the electronic appliance, when communication is established between the electronic appliance and the access point of the vehicle, the checking step is a process of receiving information gathered by the vehicle through the communication and checking to see that an electronic appliance remains left.

According to this aspect, under a communication environment where a vehicle serves as an access point for an electronic appliance, it is possible to detect that there is an electronic appliance left in a vehicle when initiating charging by making effective use of this communication environment.

[11] <A Case in which an Electronic Appliance is Activated by Precharging Power>

The checking step, as mentioned in the section [9], is a process in which, before start of a charging operation, the power supply device performs precharging to a vehicle by means of electromagnetic coupling for a given period of time and an electronic appliance receiving electric power by electromagnetic waves generated at this time emits wireless communication information, based on which checking is performed to see that the electronic appliance remains left.

According to this aspect, even if an electronic appliance left in a vehicle is in a power-off state, the electric appliance is allowed to generate and emit wireless communication information by receiving electric power by electromagnetic waves generated by precharge. Thereby, checking can be performed to see that the electronic appliance remains left.

[12] <A Case in which the Power Supply Device Receives Wireless Communication Information Via a Wireless Communication Function of a Vehicle>

The checking step, as mentioned in the section [11], is a process in which an electronic appliance receiving electric power by the electromagnetic waves emits wireless communication information and the power supply device receives the wireless communication information via a wireless communication function of the vehicle and checks to see that an electronic appliance remains left.

According to this aspect, even if the transmission power of an electronic appliance to transmit wireless communication information is so weak that the power supply device cannot receive it directly, the power supply device can receive it via the wireless communication function of the vehicle.

[13] <A Case in which the Power Supply Device Directly Receives Wireless Communication Information>

The checking step, as mentioned in the section [11], is a process in which an electronic appliance receiving electric power by the electromagnetic waves emits wireless communication information and the power supply device directly receives the wireless communication information and checks to see that an electronic appliance remains left.

According to this aspect, there is no need for an unnecessary repeater, if the transmission power of an electronic appliance to transmit wireless communication information is strong enough for the power supply device to receive it directly.

[14] <A Case in which an Electronic Appliance is Activated to Output Wireless Communication Information by Beacon Inside a Vehicle>

The checking step, as mentioned in the section [9], is a process in which an electronic appliance, upon receiving a predefined beacon which is generated inside a vehicle, is activated and emits wireless communication information, based on which checking is performed to see that the electronic appliance remains left.

According to this aspect, even for an electronic appliance that is activated by receiving a predefined beacon, checking can be performed to see that the appliance remains left by using the appliance's communication function.

[15] <Power Supply Device/Vehicle Displaying Information that an Electronic Appliance Remains Left>

The notification step, as mentioned in the section [9], is a process in which the power supply device or the vehicle displays information that an electronic appliance remains left.

According to this aspect, it is possible to visually prompt the vehicle user to retrieve the left electronic appliance.

[16] <Displaying Product Information of an Electronic Appliance>

The checking step, as mentioned in the section [9], includes a process of obtaining, from a vehicle, product information of an electronic appliance which has been obtained based on wireless communication information, and the notification step is a process in which the power supply device or the vehicle displays the product information of the electronic appliance obtained by the checking step.

According to this aspect, it is possible to identify what type of an electronic appliance left in a vehicle. Thus, it is possible to improve the effect of prompting the vehicle user to retrieve the electronic appliance left in the vehicle.

[17] <Obtaining Product Information from ID Information Included in Wireless Communication Information>

The wireless communication information, as mentioned in the section [16], includes ID information of the electronic appliance itself and the checking step includes a process of obtaining, from a vehicle, product information which is obtained by making reference to a database in which a mapping between ID of an electronic appliance and its product information has been registered beforehand and searching for a match with the ID information included in the wireless communication information.

According to this aspect, the use of the database, though requiring data registration into the database, can contribute reduction in the amount of information to transmit, as compared with a case in which product information of an electronic appliance is directly transmitted, included in wireless communication information.

[18] <Decrypting Encrypted Product Information and Using it>

As mentioned in the section [16] or [17], product information of an electronic appliance which is obtained from the vehicle is encrypted. The checking step includes a process of decrypting encrypted product information. The notification step makes product information displayed that has been decrypted by the checking step.

According to this aspect, it is possible to prevent personal information from leaking out by disseminating plain-text product information of an electronic appliance owned by a person.

[19] <Detecting that an Electronic Appliance Remains Left in a Vehicle Based on Output of the Electronic Appliance>

A non-contact power supply system is a system that enables charging electricity to a vehicle by electromagnetically coupling a power receiving coil mounted in the vehicle to a power supply coil of a power supply device which is placed to an outside of the vehicle. The power supply device includes a power supply unit that supplies electric power to the power supply coil and a power supply control unit that controls operation of the power supply unit. The power supply control unit includes a control function of detecting that an electronic appliance remains left inside the vehicle, based on wireless communication information emitted by the electronic appliance left inside the vehicle.

According to this aspect, before start of charging, an electronic appliance that remains left in a vehicle can be found, based on wireless communication information emitted by the appliance. Thus, it is possible to easily take action for preventing breakdown of an electronic appliance by electromagnetic waves generated by electromagnetic coupling for power supply.

[20] <A Case in which Communication is Established Between an Electronic Appliance and an Access Point of a Vehicle>

In section [19], when the vehicle is equipped with a function of serving as an access point for the electronic appliance to communicate with a wireless communication function of the electronic appliance, when communication is established between the electronic appliance and the access point of the vehicle, the power supply control unit detects that an electronic appliance remains left, based on wireless communication information gathered by the vehicle through the communication.

According to this aspect, under a communication environment where a vehicle serves as an access point for an electronic appliance, it is possible to detect that there is an electronic appliance left in a vehicle when initiating charging by making effective use of this communication environment.

[21] <A Case in which an Electronic Appliance is Activated by Precharging Power>

The power supply control unit, as mentioned in the section [19], issues a precharge command to the power supply unit before issuing a command to start a charging operation. Upon having received the precharge command, the power supply unit executes power supply from the power supply coil only for a given period of time. An electronic appliance receiving electric power by resulting electromagnetic waves emits wireless communication information, based on which the power supply control unit detects that the electronic appliance remains left.

According to this aspect, even if an electronic appliance left in a vehicle is in a power-off state, the electric appliance is allowed to generate and emit wireless communication information by receiving electric power by electromagnetic waves generated by precharge. Thereby, checking can be performed to see that the electronic appliance remains left.

[22] <An Electronic Appliance Including a Wireless Communication Circuit that is Supplied with Power from a Power Supply Antenna that Resonates with Electromagnetic Waves>

A circuit that generates and emits wireless communication information by the electromagnetic waves, as mentioned in the section [21], is an external circuit attached to a housing of the electronic appliance and includes a power supply antenna that receives and resonates with the electromagnetic waves and a first circuit that is supplied with power from the power supply antenna and carries out wireless communication. The power supply control unit receives wireless communication information emitted by the first circuit via a second wireless communication circuit within a vehicle.

According to this aspect, a circuit that generates and emits wireless communication information by electromagnetic waves can be implemented simply. Even if the transmission power of such a simple circuit (the first circuit) to transmit wireless communication information is so weak that the power supply device cannot receive it directly, the power supply device can receive it via a wireless communication function provided by the second circuit in the vehicle.

[23] <Power Supply Control According to an Allowable Current Value of an Electronic Appliance Left in a Vehicle>

The power supply control unit, as mentioned in the section [19], when having detected that an electronic appliance remains left inside a vehicle, controls a charging current value according to an allowable current of the detected electronic appliance.

According to this aspect, when an electronic appliance remaining left in a vehicle has been found, a current value of power supply is controlled according to an allowable current value of the electronic appliance. Thus, it is possible to prevent breakdown of an electronic appliance by electromagnetic waves generated by electromagnetic coupling for power supply.

[24] <Wireless Communication Information Including an Allowable Current Value of the Electronic Appliance Itself>

The allowable current value, as mentioned in the section [23], is obtained, based on the wireless communication information.

According to this aspect, it is very easy to obtain an allowable current value of an electronic appliance remaining left.

[25] <Notifying that an Electronic Appliance Remains Left to the Vehicle>

The power supply control unit, as mentioned in the section [19], when having detected that an electronic appliance remains left inside a vehicle, performs control to cause the power supply device or the vehicle to display alert information for notifying that fact.

According to this aspect, when an electronic appliance remaining left in a vehicle has been found, alert information is displayed to notify that the electronic appliance remains left. Thus, it is possible to positively prompt the vehicle user to retrieve the appliance and improve the effect of preventing breakdown of an electronic appliance by electromagnetic waves generated during power supply.

2. Further Detailed Description of Embodiments

Embodiments are described in greater detail.

<Power Supply Control According to an Allowable Current Value of an Electronic Appliance Left in a Vehicle>

FIG. 1 depicts an example of a non-contact power supply system. The non-contact power supply system. 1 depicted in FIG. 1 is a system for supplying electric power to an electric vehicle (which may be simply referred to as a vehicle hereinafter), such as an electric-powered car and a plug-in hybrid car and charging its battery.

The non-contact power supply system 1 is to charge electricity to an electric vehicle 2 and includes a charging spot 3 and a primary coil 4 as a power supply coil that is coupled to the charging spot 3.

The electric vehicle includes a secondary coil 5 as a power receiving coil that is electromagnetically coupled to the primary coil 4 and receives electric power so as to be supplied with power in a contactless manner. The electric power supplied to the secondary coil 5 is charged to a battery unit 7 under control of a power receiving unit 6. For example, when high-frequency power is supplied to the primary coil 4, the secondary coil 5 resonates with the primary coil 4 via an electromagnetic field and, thereby, the power receiving unit 6 receives electric power. The received electric power is used by the power receiving unit 6 to charge the battery unit 7 according to a predefined charging sequence.

A communication module 9 has a communication function to communicate with an electronic appliance 10 such as a product of consumer electronics which has been left in the electric vehicle 2 during charging and to further communicate with the charging spot 3 via an antenna 11. The communication module 9 forms an example of a second wireless communication circuit to perform communication with the electronic appliance 10 left in the electric vehicle 2. Other control system and drive system components of the electric vehicle 2 are not specific to the present embodiment and publicly known components or the like may expediently be adopted, as appropriate; therefore, their detailed description is omitted.

Figure 2:
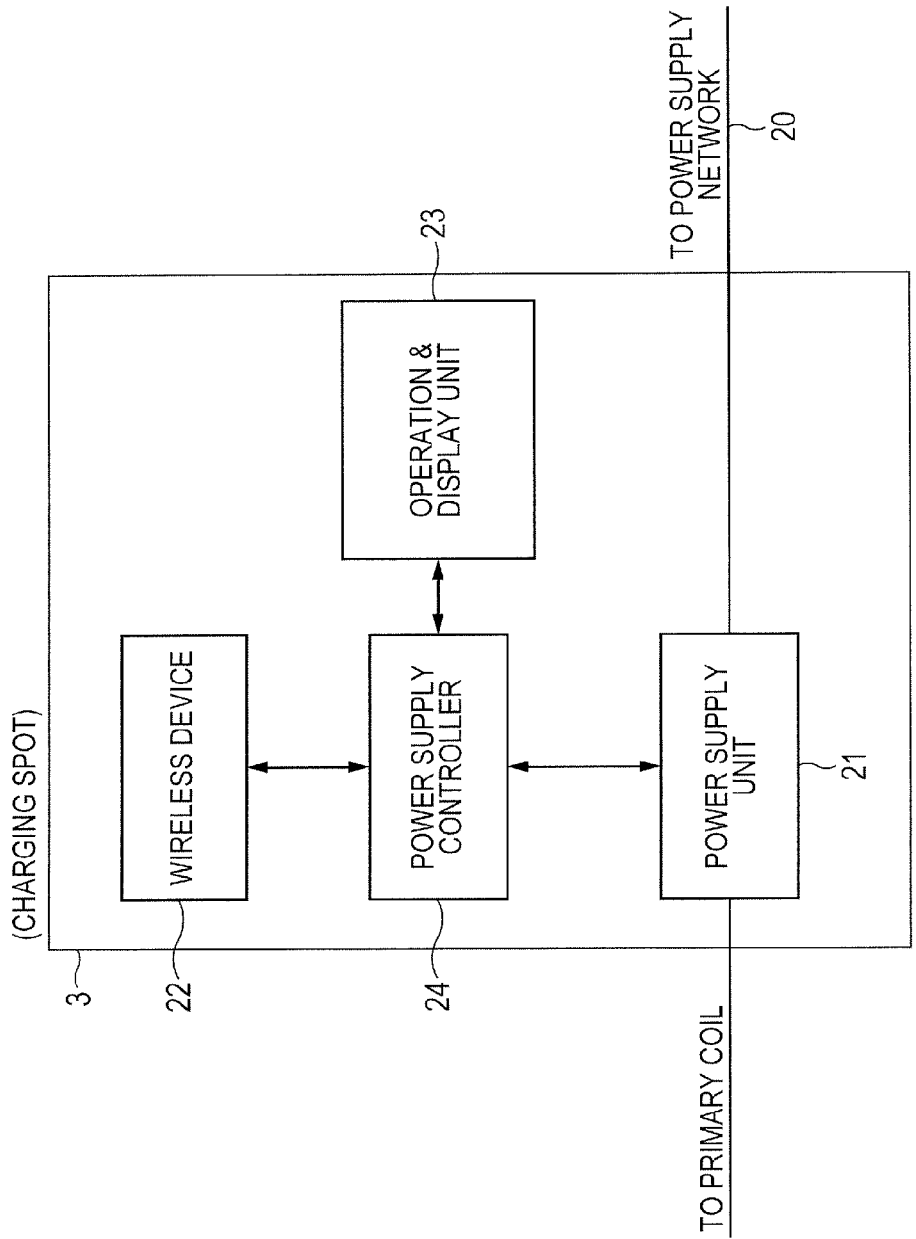
FIG. 2 is a block diagram depicting an example of a charging spot.

FIG. 2 depicts an example of the charging spot 3. The charging spot 3 includes a power supply unit 21 as a charging unit that supplies high-frequency power to the primary coil 4 through the use of electric power from a power supply network 20, a wireless device 22 carrying out wireless communication with the electric vehicle 2, an operation and display unit 23 for operation and display for charging, and a power supply controller 24 as a power supply control unit.

The power supply unit 21 is coupled to the power supply network 20, receives a signal from the power supply controller 24, and controls power supply. The wireless device 22, power supply unit 21, and operation and display unit 23 are each coupled to the power supply controller 24 and put under its control. While the above power supply unit 21, power supply controller 24, wireless device 22, and operation and display unit 23 are described individually for the sake of explanatory convenience, the same effect can also be achieved with a single module including all the above functions or with some modules including any combination of the functions.

Figure 3:
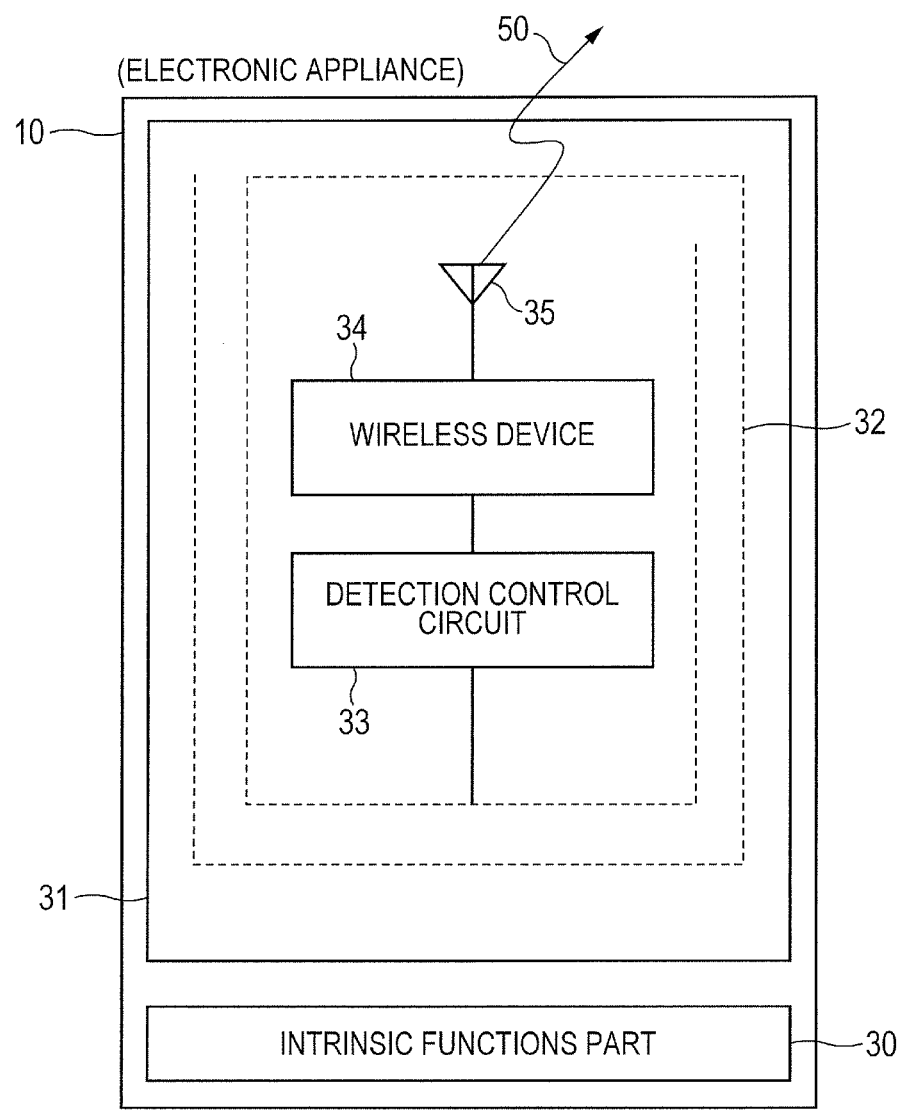
FIG. 3 is a block diagram depicting an example of an electronic appliance that is to be detected, if remained in a vehicle.

FIG. 3 depicts an example of an electronic appliance that is to be detected, if remained in the vehicle 2. The electronic appliance refers to any of the following: a mobile terminal, a personal computer, a gaming console, an IC recorder, any other product of consumer electronics, etc. In FIG. 3, an intrinsic functions part of the electronic appliance is typified by a circuit block 30. A section denoted by reference numeral 31 in FIG. 3 typifies a circuit section for generating wireless communication information to indicate that the electric appliance remains left. It is, for example, a circuit that generates wireless communication information by the above-mentioned electromagnetic waves and it is configured as an external circuit attached to the housing (internal frame or cover) of the electronic appliance 10, including a power supply antenna 32 that receives and resonates with electromagnetic waves from the primary coil 4 and the secondary coil 5 and a detection control circuit 33 and a wireless device 34 which operate, supplied with power from the power supply antenna 32. The detection control circuit 33 rectifies a high-frequency signal received by the power supply antenna 32, generates an operating power, and controls a transmission operation of the wireless device 34 using the generated power. The wireless device 34 is an example of a first circuit carrying out wireless communication with the communication module 9 of the vehicle 2 and is adapted to be capable of generating and emitting wireless communication information 50 from the antenna 35. Wireless communication information transmitted from the antenna 35 is received by the communication module 9 and subjected to processing according to what information was received, and predefined data is arranged to be transmitted from the antenna 11 and given to the charging spot 3. Accordingly, the communication module 9 of the vehicle and the charging spot 3 can become aware of that the electronic appliance 10 remains left in the vehicle.

The circuit denoted by reference numeral 31 is not limited to an external circuit attached to the housing by sealing or the like. This circuit may be embedded within the electronic appliance 10 and can be configured by making use of an intrinsic function such as a near field communication function that electronic appliance 10 has. In a system configuration making use of the near field communication function that electronic appliance 10 has, such a case is conceivable that the remaining amount of the battery provided in the electronic appliance 10 is not sufficient. In such a case, it is effective that the detection control circuit 33 monitors the battery and carries out communication using electric power supplied from the power supply antenna 32. While the above detection control circuit 33, power supply antenna 32, wireless device 34, and antenna 35 are described individually for the sake of explanatory convenience, the same effect can also be achieved with a single module including all the above functions or with some modules including any combination of the functions.

Figure 4:
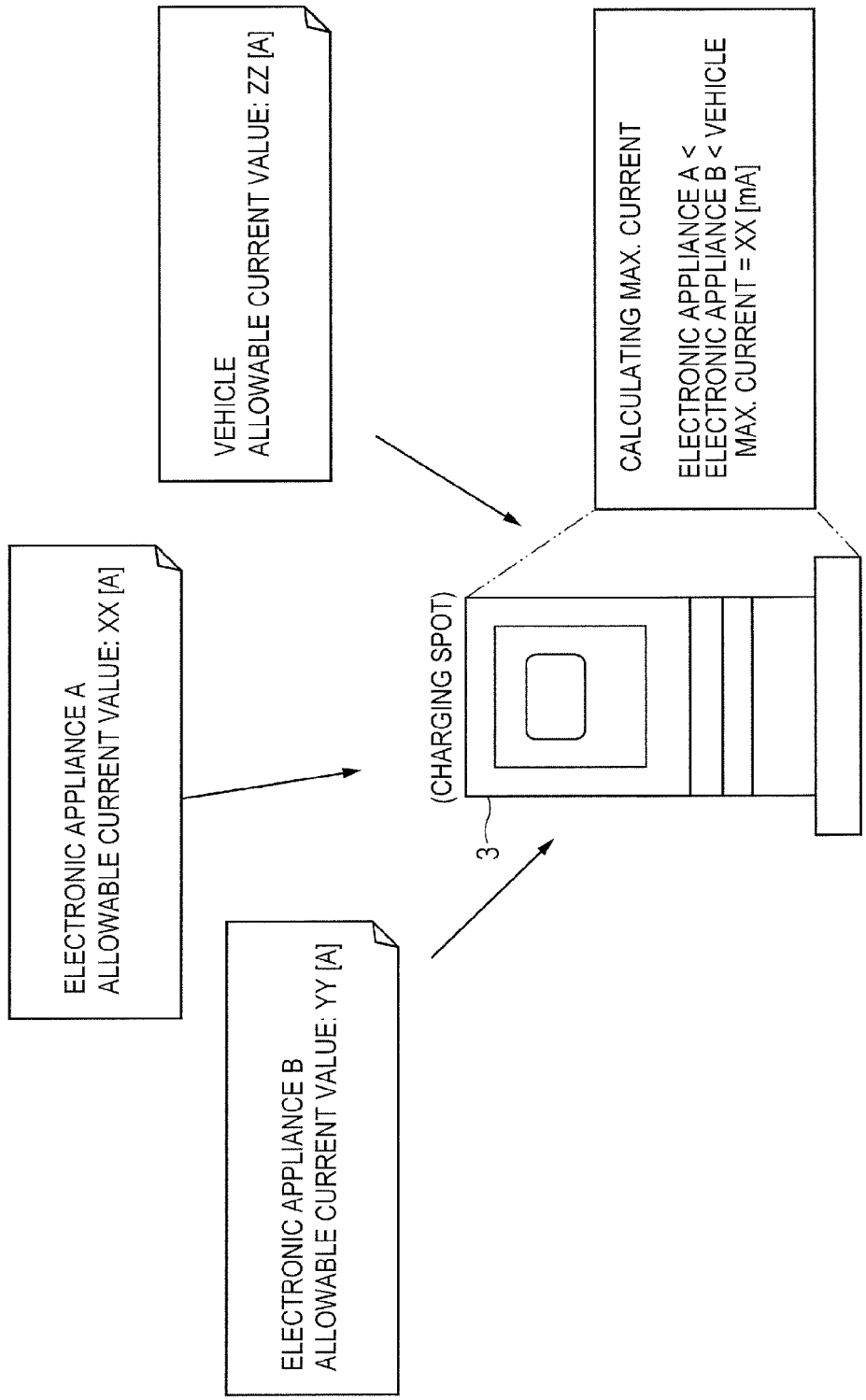
FIG. 4 is an explanatory diagram illustrating a method of power supply control based on an allowable current value of an electronic appliance left in a vehicle.

In a case where power supply for charging is controlled according to an allowable current value of the electronic appliance in response to a situation when an electronic appliance remains left in the vehicle is explained. That is, if a maximum allowable current of the electronic appliance 10 is fixed, a comparison is made between the maximum allowable currents of both the electronic appliance 10 left in the vehicle and the vehicle 2 and a maximum current of power that is supplied by the charging spot 3 is estimated so that an electromagnetic field generated does not break down the electronic appliance 10. For example, as in FIG. 4, if electronic appliances A and B remains left in the vehicle, the charging spot 3 compares the respective maximum allowable current values of the electronic appliances A and B and the vehicle, finds the smallest current value, and, when initiating charging, controls electric power (maximum current) to drive the primary coil 4 so that the smallest current value thus found will be equal to an allowable current value. Accordingly, charging can be performed without breaking down the electronic appliance 10, even if left in the vehicle.

Figure 5:
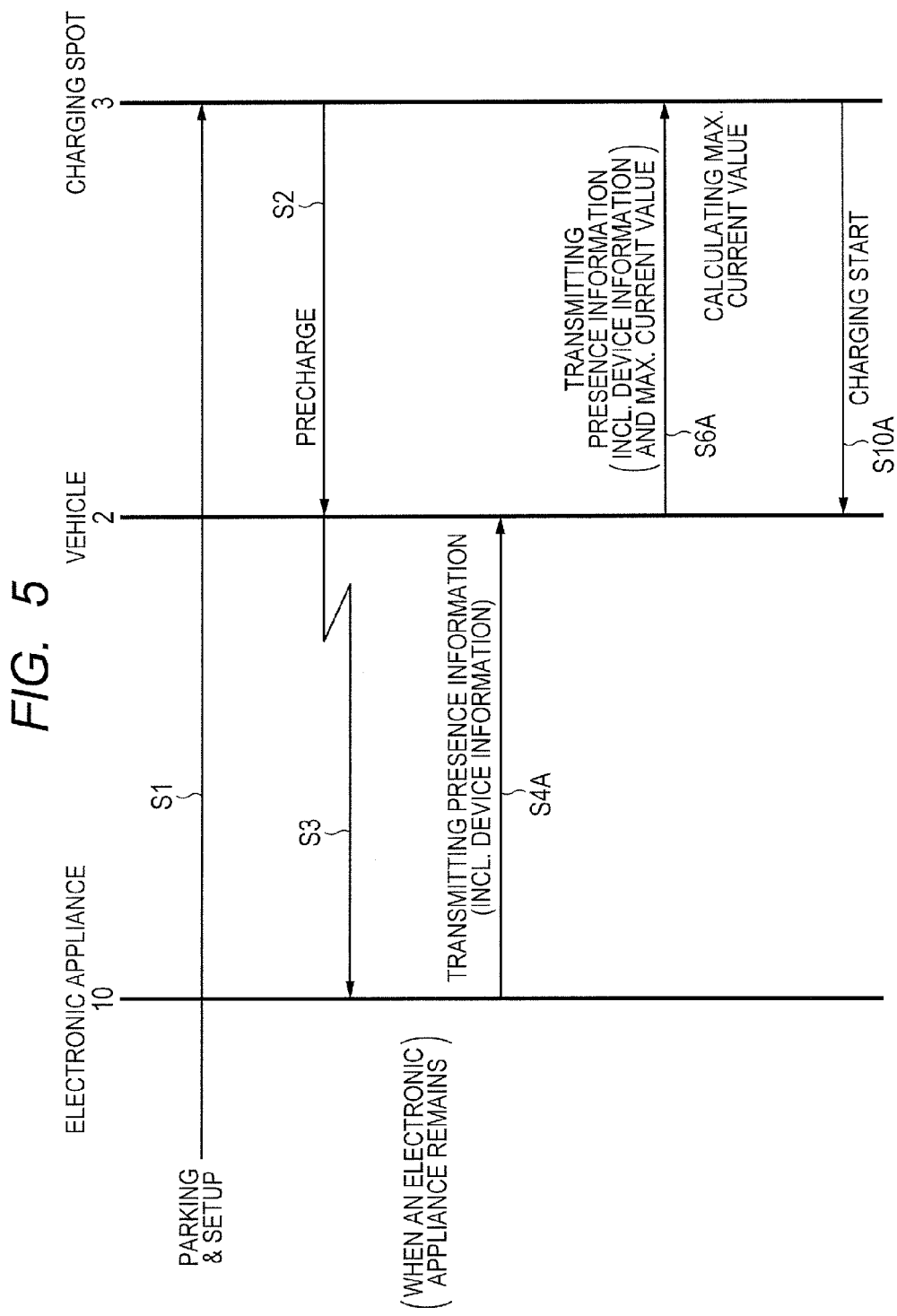
FIG. 5 is a flowchart illustrating an operational procedure for detecting an electronic appliance left in a vehicle and controlling the charging current taking account of an allowable current and the like of the electronic appliance.

FIG. 5 illustrates an operational procedure for detecting an electronic appliance left in a vehicle and controlling the charging current taking account of an allowable current and the like of the electronic appliance. The operation of detecting an electronic appliance may be performed during or after a setup operation that makes the charging spot 3 ready to supply electric power after the user of the vehicle 2 parks the vehicle 2 in a predetermined position for charging. In FIG. 5, an arrangement was made so that the detecting operation is performed after the setup.

In FIG. 5, first, parking and setup are performed (S1). For this setup, a normal setup operation should be performed using a publicly known operational procedure. After the completion of parking and setup (S1), the power supply controller 24 of the charging spot 3 issues a precharge command to the power supply unit 21 (S2). At the same time, the vehicle 2 starts up the communication module 9 and makes it ready for communication. Doing so at this timing is to suppress power consumption of the vehicle. The communication module 9 may be put ready for communication at all times and may be activated at the start of the setup for charging; it may be started up at any timing before a sequence of checking to see that an electronic appliance is present. Upon having received the precharge command, the power supply unit 21 supplies electric power to the primary coil 4 for a given period of time. At this point of time, charging time is preferably very short, such as, e.g., 3 through 10 seconds, as compared with normal charging time, if a power supply voltage is the same as for a normal charging operation. When a precharge voltage is different from and lower than a normal voltage, it is preferable to make precharging time longer accordingly.

Then, operation of an electronic appliance 10 left in the vehicle 2 is described. The power supply antenna 32 of the electronic appliance 10 receives electromagnetic waves provided by the primary coil 4 and generates electric power (S3). Using this electric power, the detection control circuit 33 sends the wireless device 34 a command to transmit wireless communication information as presence information to indicate the presence of the appliance itself. Using the electric power generated by the power supply antenna 32, the wireless device 34 of the electronic appliance 10 transmits data including device information as wireless communication information 50, namely, presence information to the communication module 9 of the vehicle 2 (S4A) and this information is received by the communication module 9 of the vehicle 2. For example, the power receiving unit 6 of the vehicle 2 calculates a maximum current value of power supply, based on the wireless communication information 50 including the device information and the calculated maximum current value is transmitted through the communication module 9 to the charging spot 3 (S6A). The charging spot 3 starts charging, taking the maximum current value as an allowable current value (S10A). Although, in this example, a description is provided, assuming that calculating a maximum current value is performed at the charging spot 3, the same effect can also be achieved by calculating a maximum current value at the vehicle 2 and transmitting a result of the calculation to the charging spot 3.

In order to obtain a maximum current value based on device information, the device information itself may include an allowable current value of the electronic appliance. To reduce information amount, it is possible to make reference to a database which has been registered beforehand in the vehicle 2, using a search key of device information. That is, the device information as wireless communication information should include ID information of the electronic appliance itself. A database is prepared in which a mapping between ID of an electronic appliance 10 and its allowable current value has been registered beforehand. By making reference to the database and searching for a match with the ID information included in the wireless communication information, information of the allowable current value is obtained.

FIG. 6 illustrates wireless communication information that is output from an electronic appliance 10. FIG. 7 illustrates wireless communication information that is output from a vehicle 2. In FIGS. 6 and 7, parenthesized information is not requisite information. The wireless communication information that is output from the electronic appliance 10 may not have added information of a maximum allowable current value of the electronic appliance. This is because that information can be obtained by using the database. The wireless communication information that is output from the vehicle 2 may not have added device information. This is because the maximum allowable current value of the corresponding electronic appliance is already known at this point of time.

Figure 8:
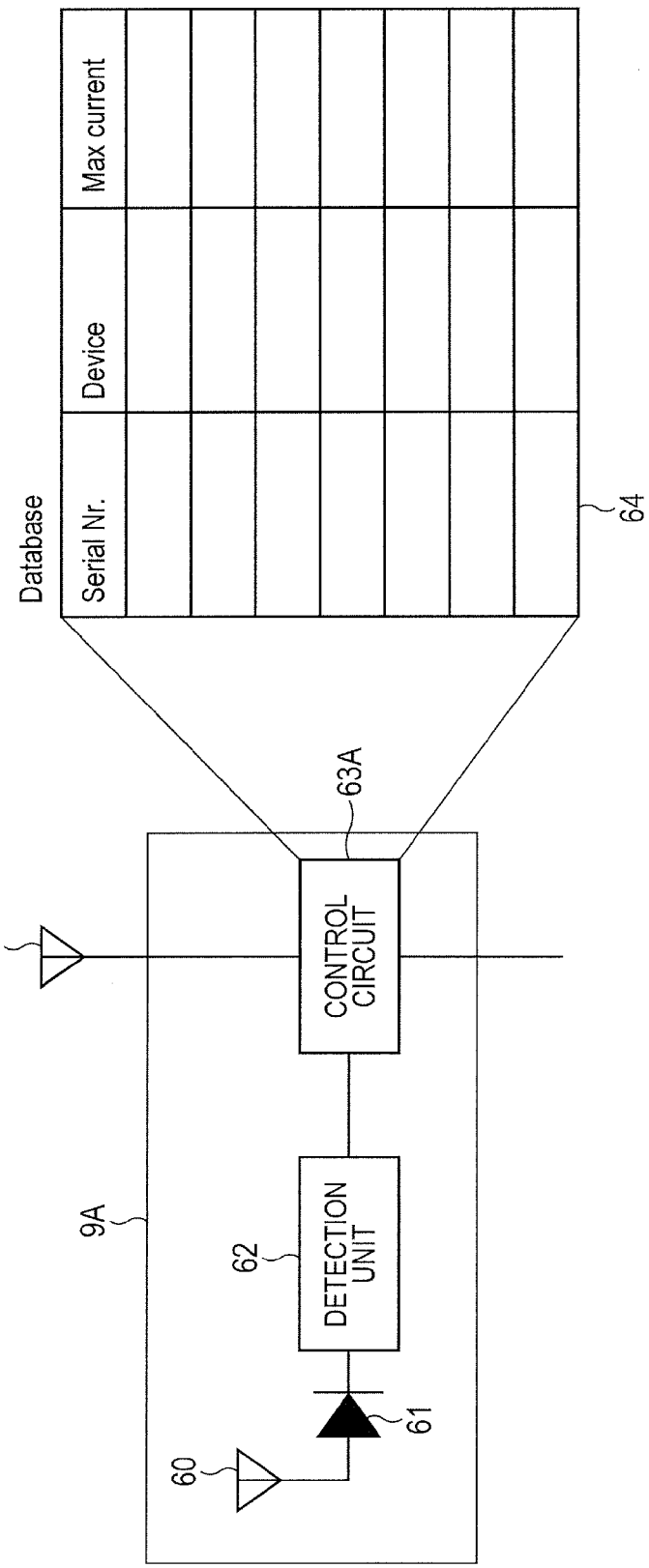
FIG. 8 is an explanatory diagram illustrating a database structure mapping between device IDs and maximum allowable current values.

FIG. 8 illustrates a database structure mapping between device IDs and maximum allowable current values. In a case where a maximum allowable current value is transmitted from the vehicle 2, as in FIG. 7, it is expedient to provide a database 64 in a control circuit 63A provided in the communication module 9A. In the database 64, for each piece of information such as a serial number by which an entry can be identified, the ID of an electronic appliance as device information and its maximum allowable current value are paired. The control circuit 63A searches the database 64 using a search key of device information that is included in the wireless communication information received from the electronic appliance 10 and controls transmission of a maximum allowable current value that has been searched out from the antenna 11 to the charging spot 3. The power receiving unit 6 may have this database and use it in the same way.

Because it is preferable to calculate a maximum current value with the inclusion of a current value that is provided from the power supply network 20, executing the calculation within the charging spot 3 is considered to be the most efficient. However, substantially the same effect can also be achieved by checking to see that an electronic appliance 10 is present in the vehicle 2 and calculating a maximum current. When doing so, with the addition of a current value that is provided from the power supply network 20, the calculation is executed. However, generally, there is almost no likelihood that electric power that is provided from the power supply network 20 is lower than a maximum allowable current value of the electronic appliance 10. Thus, substantially, an upper limit may expediently be determined to be the maximum allowable current of the electronic appliance 10. When a maximum current has been estimated as above, some value of the maximum allowable current of the electronic appliance 10 that is present in the vehicle 2 may make charging time unrealistic. In that event, in combination with an alarm, as set forth in a second embodiment which will be described later, it is possible to allow the user to select one of the following options: charging as per the calculated maximum current value; starting charging after removing the electronic appliance 10 that is present in the vehicle 2; and forcedly executing charging.

Figure 9:
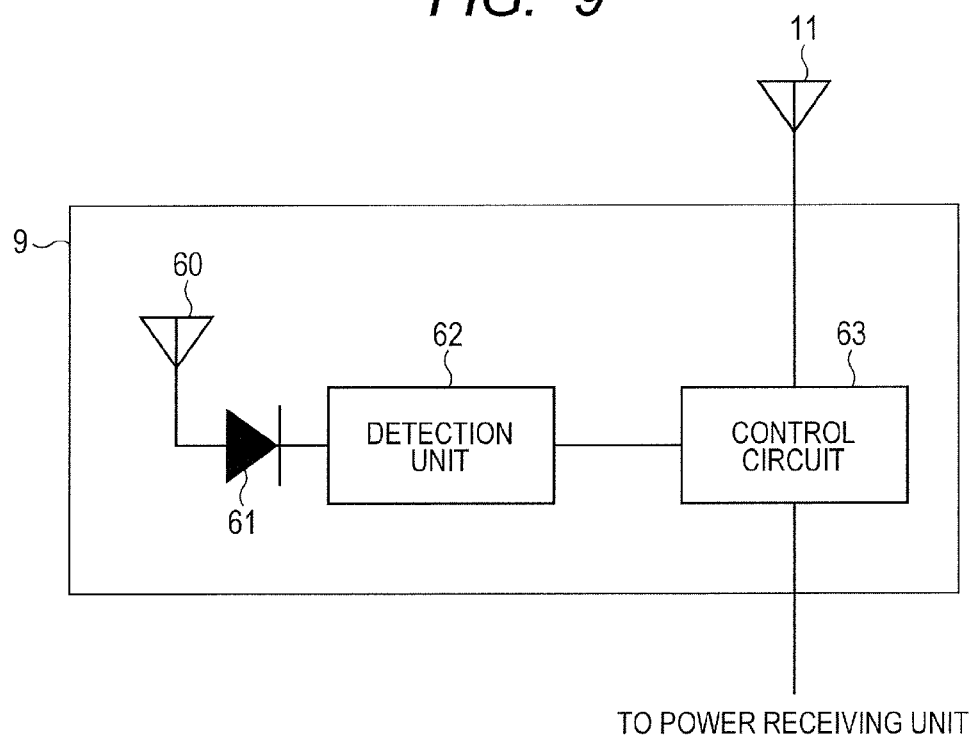
FIG. 9 is a block diagram depicting an example of a communication module that is mounted in a vehicle.

FIG. 9 depicts an example of a communication module 9 that is mounted in a vehicle 2.

An electronic appliance 10 that may remain left in the vehicle 2 is one of various types of electronic appliances which may transmit radio waves in a broad spectrum of radio waves with different frequencies and phases, when generating and emitting wireless communication information 50. Mounting a plurality of antennas on the vehicle to detect the radio waves of all the frequencies is impractical in terms of both implementation and cost. The configuration illustrated in FIG. 9 is contrived to cope with this matter. That is, a diode 61 is coupled to a receive-only antenna 60 and a detection unit 62 that follows performs integration of half-waves which are output from the diode 61. By receiving an output of the detection unit 62 by a control circuit 63, the control circuit 63 senses that an electronic appliance remains left in the vehicle. When the control circuit 63 senses that an electronic appliance remains left, it generates code information representing that fact and controls an alert display inside the vehicle or transmits code information to notify that an electronic appliance remains left to the charging spot 3. Accordingly, even when an electronic appliance transmits a signal of any frequency in abroad spectrum of frequency bands to output wireless communication information, it would become possible to detect that signal.

If wireless communication information 50 is to be carried by a signal with a specified frequency in usage, it is unnecessary to take consideration described in conjunction with FIG. 9.

According to the foregoing first embodiment, before start of charging, an electronic appliance that remains left in the vehicle is found by wireless communication information emitted by the electronic appliance and a current value of power supply is controlled according to an allowable current value of the electronic appliance. Thus, it is possible to prevent breakdown of an electronic appliance by electromagnetic waves generated by electromagnetic coupling for power supply.

<Alert that an Electronic Appliance Remains Left>

In the foregoing embodiment, when an electronic appliance remains left in the vehicle, power supply is controlled according to an allowable current value. However, in the second embodiment, upon having detected that an electronic appliance remains, an alert is generated to prompt the vehicle user to remove the appliance. Other than this difference point, the second embodiment is the same as the first embodiment and, therefore, its detailed description is omitted.

Figure 10:
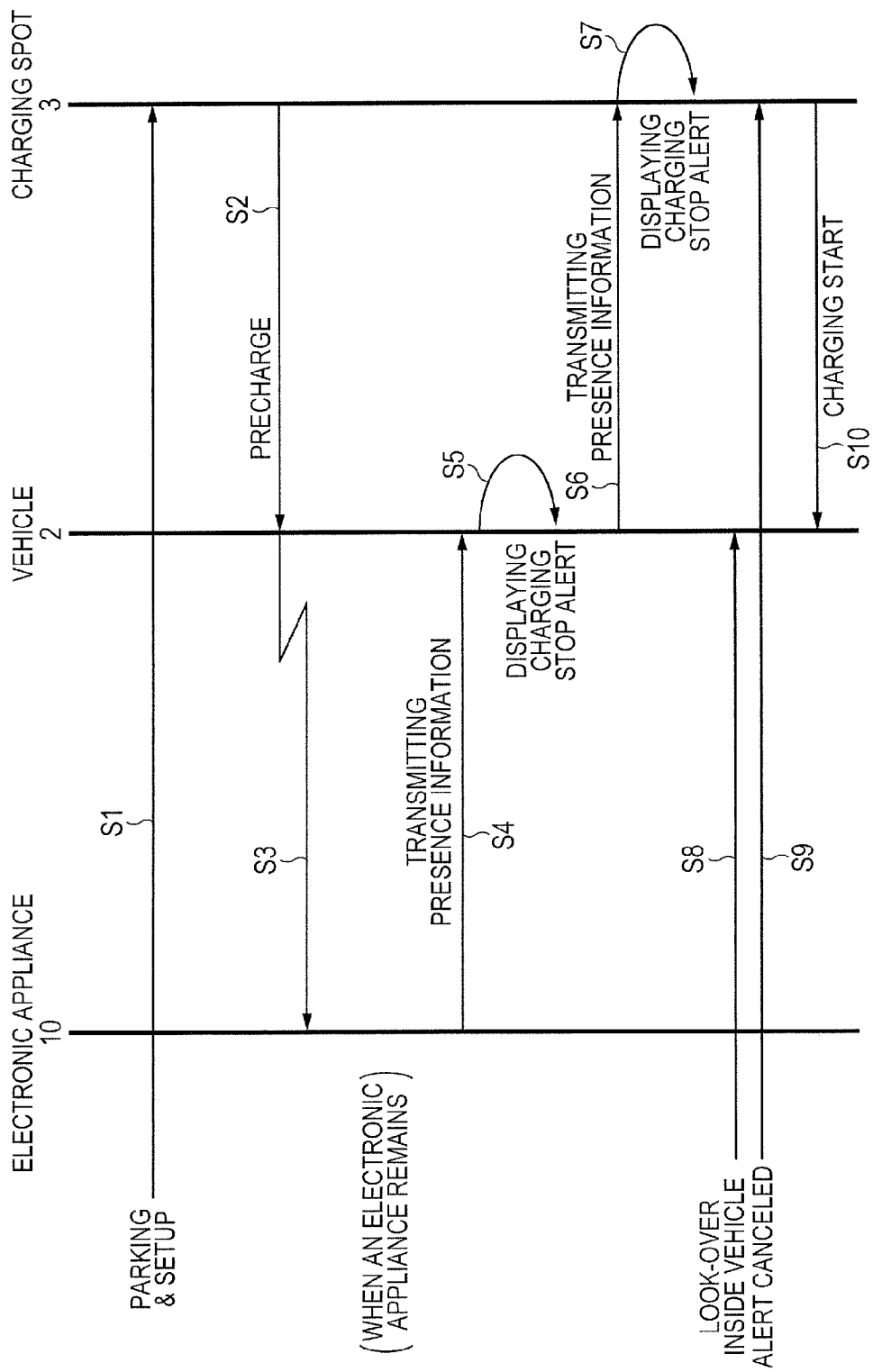
FIG. 10 is a flowchart illustrating an operational procedure for detecting an electronic appliance left in a vehicle and generating an alert to prompt the vehicle user to remove the electronic appliance.

FIG. 10 illustrates an operational procedure for detecting an electronic appliance left in a vehicle and generating an alert to prompt the vehicle user to remove the electronic appliance. Generating an alert may be performed during or after a setup operation that makes the charging spot 3 ready to supply electric power after the user of the vehicle 2 parks the vehicle 2 in a predetermined position for charging. FIG. 10 illustrates a case where an alert is generated after the setup.

In FIG. 10, first, parking and setup are performed (S1). For this setup, a normal setup operation should be performed using a publicly known operational procedure.

After the completion of setup for charging (S1), the power supply controller 24 of the charging spot 3 issues a precharge command to the power supply unit 21 (S2). At the same time, the vehicle 2 starts up the communication module 9 and makes it ready for communication. Doing so at this timing is to suppress power consumption of the vehicle. The communication module 9 may be put ready for communication at all times and may be activated at the start of the setup for charging; it may be started up at any timing before a sequence of checking to see that an electronic appliance is present. Upon having received the precharge command, the power supply unit 21 supplies electric power to the primary coil 4 for a given period of time. At this point of time, charging time is preferably very short, such as, e.g., 3 through 10 seconds, as compared with normal charging time, if a power supply voltage is the same as for a normal charging operation. When a precharge voltage is different from and lower than a normal voltage, it is preferable to make precharging time longer accordingly.

Then, operation of an electronic appliance 10 left in the vehicle 2 is described. The power supply antenna 32 of the electronic appliance 10 receives electromagnetic waves provided by the primary coil 4 and generates electric power (S3). Using this electric power, the detection control circuit 33 sends the wireless device 34 a command to transmit wireless communication information as presence information to indicate the presence of the appliance itself. Using the electric power generated by the power supply antenna 32, the wireless device 34 of the electronic appliance 10 transmits the wireless communication information 50 to the communication module 9 of the vehicle 2 (S4). Upon having received the wireless communication information 50, the vehicle 2 displays an alert that the electronic appliance 10 remains left in the vehicle by using, e.g., a car navigation system of the vehicle (S5). Various forms of alerting are conceivable, such as an alarm, flashing, and displaying a message on the display. For example, in the case of displaying a message on the display, such a message may be displayed that you have left an electronic appliance in the vehicle; the appliance remaining left has a risk of breaking down; and charging will not start unless you retrieves it.

The vehicle 2 further provides the wireless communication information 50 to the wireless device 22 of the charging spot 3 via the antenna 11 (S6). Upon having received the wireless communication information 50, the charging spot 3 displays the alert that the electronic appliance 10 remains left in the vehicle on the operation and display unit 23 (S7). If having large transmission power, the electronic appliance may transmit the wireless communication information 50 directly to the wireless device 22 of the charging spot 3 as well.

Although not restrictive, the wireless communication information 50 may be data that directly represents a particular alert, but may be a particular code or a periodic signal with a predefined frequency band if this information is uniformed across the system.

When an alert that an electronic appliance remains left occurs in this way, a person who is using the charging spot 3 (a person who is inside the vehicle 2) should look for the appliance inside the vehicle (S8). For example, only when the alert that the charging spot 3 issues at this time has been cancelled (S9), the charging spot 3 starts charging (S10); or it waits according a predefined control sequence. Until then, the charging spot 3 does not start charging. Or an option may be provided that charging can be started forcedly by the user.

Although, in the above-described case, the alert is displayed in both places, i.e., inside the vehicle 2 and at the charging spot 3, the alert may be displayed only in either of the places for a system in which user operation for charging is only performed in the vehicle or a system in which such operation is only performed at the charging spot. It is preferable to display the alarm in both the places in the case of a mixed system. Alternatively, the same effect can be achieved by displaying the alert on a communication terminal such as smartphones which have lately been in widespread use.

According to the foregoing second embodiment, before start of charging, an electronic appliance that remains left in the vehicle is found by wireless communication information emitted by the electronic appliance and it is alerted that the electronic appliance remains left. Thus, it is possible to positively prompt the user to retrieve the appliance and prevent breakdown of an electronic appliance by electromagnetic waves generated by electromagnetic coupling for power supply.

<Transmitting Presence Information Using a Communication Function Intrinsic to an Electronic Appliance>

In recent years, in electronic appliances like mobile information terminals, connection services by means of Bluetooth (a registered trademark) or WiFi (a registered trademark) are put to practical use. Such a communication service is implemented by the intrinsic functions part 30 in FIG. 3. In a case where, for such a wireless communication function of an electronic appliance 10, the vehicle 2 is equipped with a function of serving as an access point of the electronic appliance 10, when communication is established between the electronic appliance 10 and the access point of the vehicle 2, it is possible that the vehicle 2 receives gathered information from the electronic appliance 10 through the communication and checks to see that electronic appliance 10 remains left in the vehicle. For example, when communication is established between the electronic appliance 10 and the access point of the vehicle 2, upon the start of communication between the charging spot 3 and the vehicle 2, which triggers charging to start, by notifying the charging spot 3 of the presence of the electronic appliance connecting to the vehicle 2 or displaying same on the display of the vehicle 2, it is possible to prevent charging from being started, while the electronic appliance 2 remains left in the vehicle 2.

<An Electronic Appliance is Activated to Output Wireless Communication Information by Beacon Inside a Vehicle>

In the description of the foregoing embodiments, with regard to triggering an electronic appliance to generate and emit presence information as wireless communication information, by way of example, in one case, the electronic appliance is activated by electromagnetic waves generated by precharge; in another case, communication between the electronic appliance and the vehicle is established using the communication function intrinsic to the electronic appliance. The triggering is not limited to these ways. For example, an electronic appliance may be triggered in the following way: when starting the charging process, the vehicle 2 generates a predefined beacon internally so that the electronic appliance is activated by receiving this beacon and generates and emits wireless communication information. For example, it may be arranged that the electronic appliance generates an operating power by receiving the beacon.

<Wireless Communication in which a Charging Spot is Identifiable>

In simple wireless communication between a vehicle and a charging spot, it is difficult with the current technology to transmit information only to a particular destination. In a case where a plurality of charging spots 3 are arrayed in parallel, when a product of consumer electronics transmits presence information indicating that it remains left in a vehicle to a charging spot, there is a possibility that all charging spots 3 that can receive the wireless signal detect and regard the presence information as valid and, thereby, all the charging sports stop charging. For this reason, there is a need for a contrivance for simply identifying which vehicle in which an electronic appliance remains left.

Figure 11:
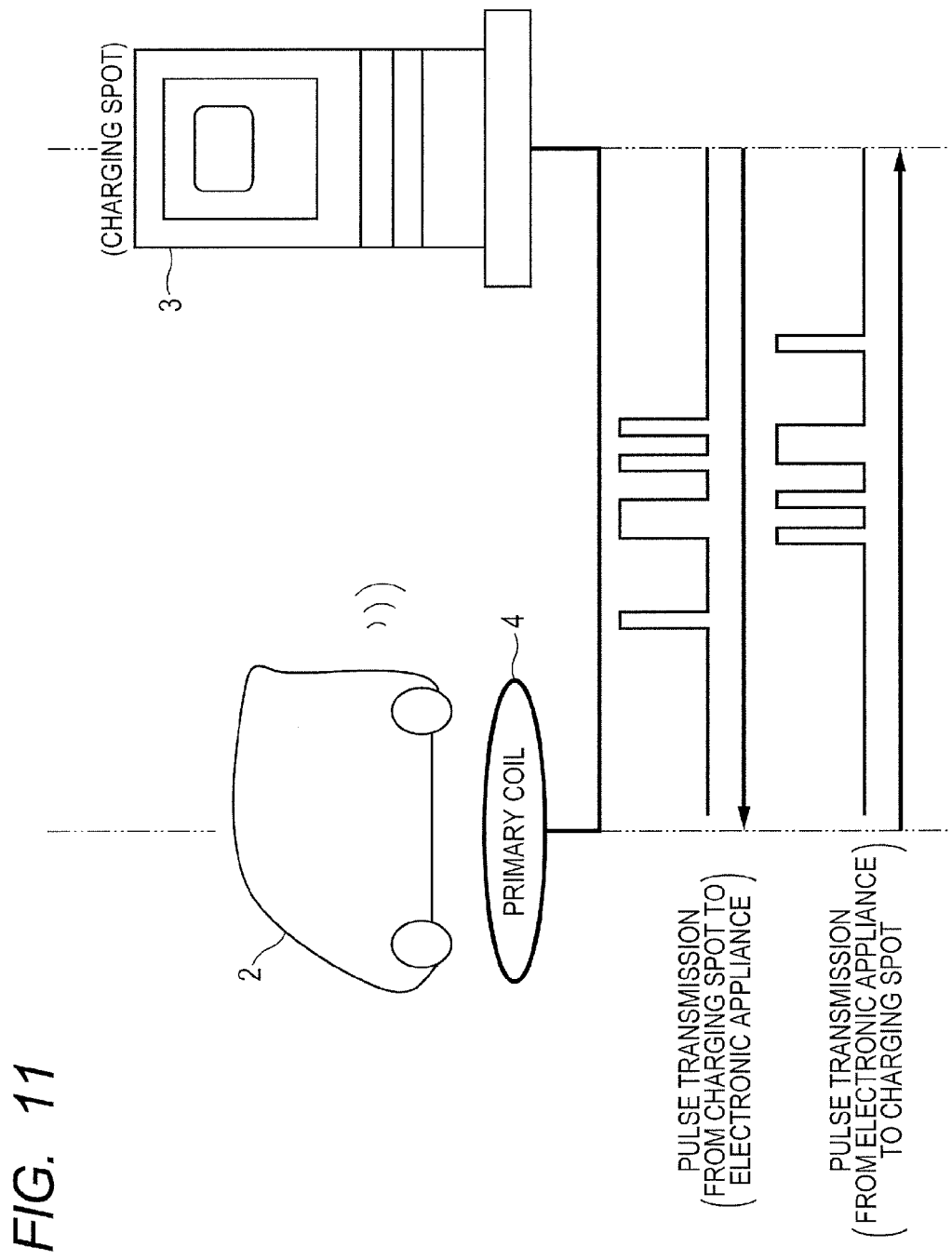
FIG. 11 is an explanatory diagram illustrating an operation for identifying which vehicle is the source of transmission of presence information by transmitting a pulse signal for precharge by a charging spot.

For example, as in FIG. 11, a charging spot 3 is adapted to transmit a pulse signal for precharge. Thereby, it would become possible to identify which vehicle is the source of transmission of presence information.

Figure 12:
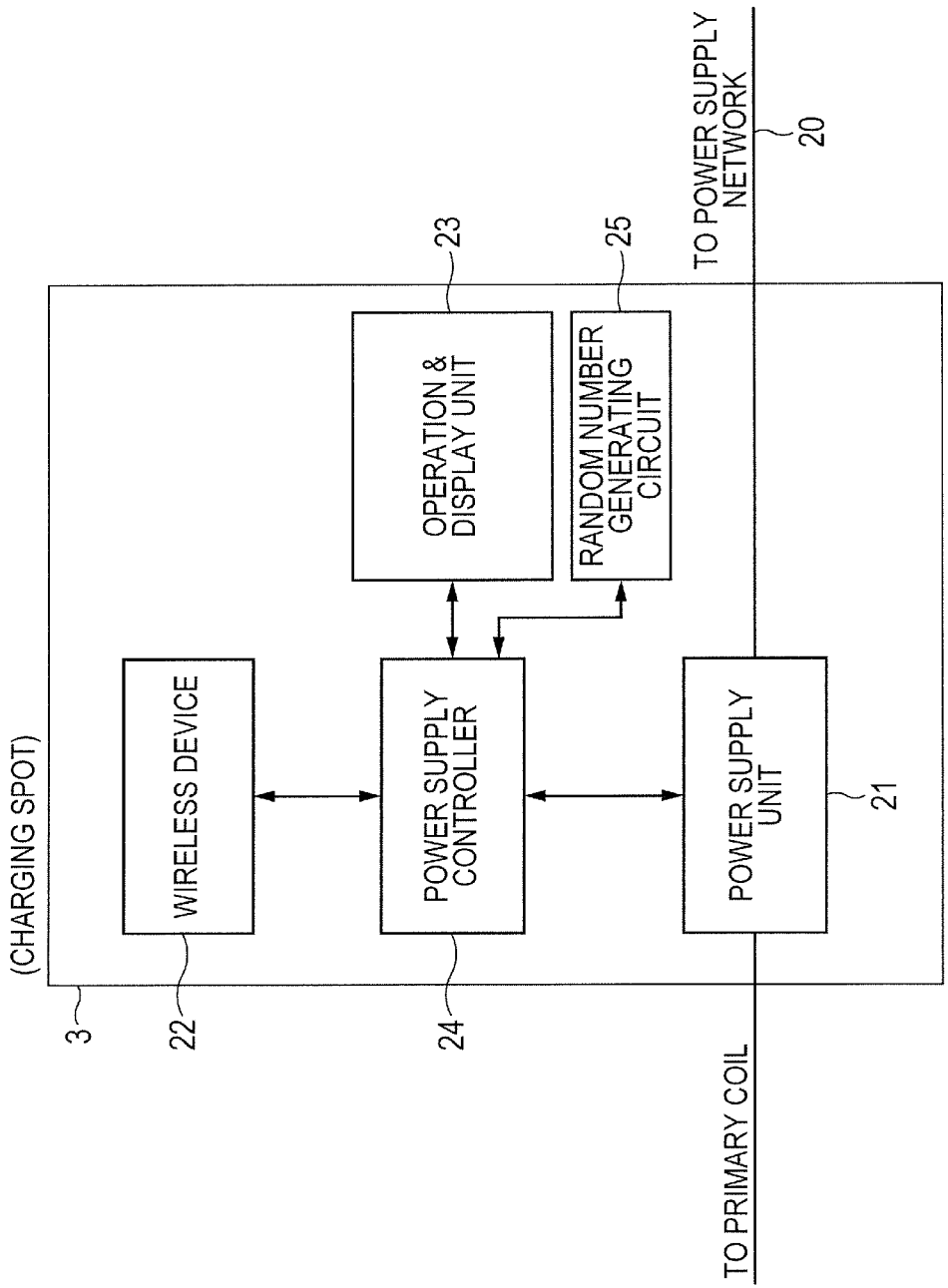
FIG. 12 is a block diagram illustrating a configuration in which a charging sport is provided with a random number generating circuit that generates a random number inside a vehicle and precharge is performed at timing in accordance with a signal waveform calculated from the random number.

In particular, as is illustrated in FIG. 12, a charging spot 3 is provided with a random number generating circuit 25 that generates a random number inside a vehicle 2. At timing in accordance with a signal waveform calculated from the random number, precharge is performed. Since an electronic appliance 10 as illustrated in FIG. 3 transmits a fixed signal only when electric power has been generated by precharge, a signal that is transmitted from the electronic appliance 10 has the same waveform as the waveform of the pulse signal for precharge transmitted by the charging spot 3. If the communication module 9 transmits presence information carried by a signal whose waveform is the same as this pulse waveform in terms of change timing, the charging spot 3 is capable of knowing whether or not an electronic appliance remains left in the vehicle to be charged by it by matching the received signal with the pulse waveform for precharge supported by it. The random number generating circuit 25 in FIG. 12 may be added as a function of the power supply controller 24. The circuit blocks in FIG. 12 having the same functions as those in FIG. 2 are assigned the same reference numerals and their detailed description is omitted.

<Displaying Product Information of an Electronic Appliance>

Product information of an electronic appliance obtained based on wireless communication information is transmitted from the vehicle to the charging spot 3. The charging spot 3 is able to display the alert including the received product information on the display. Of course, displaying same inside the vehicle 2 is also possible without problem.

If the user can know what kind of electronic appliance 10 remains left in the vehicle 2, the user can readily remove the electronic appliance 10 to look for from inside the vehicle 2. In this sense, it is preferable to transmit a signal containing product information such as the product name of an electronic appliance 10 within a signal that is transmitted from the electronic appliance 10. When doing so, the detection control circuit 33 presented in FIG. 3 may expediently transmit information that represents the name of the electronic appliance established by the manufacturer of the electronic appliance 10. The charging spot 3 can indicate to the user what electronic appliance 10 remains left in the vehicle, based on the information transmitted from the electronic appliance 10. As a way of indication, the following may expediently be used: for example, informing the user by voice, displaying a message, etc.

The above product information is not limited to that is directly included within wireless communication information 50. For example, wireless communication information 50 includes the ID information of the electronic appliance itself. A database is prepared in which a mapping between ID of an electronic appliance 10 and its product information has been registered beforehand. By making reference to the database and searching for a match with the ID information included in the wireless communication information, the product information is obtained. In this way, product information may be obtained from the vehicle. For this purpose, for example, the database in FIG. 19 may expediently be used by adding a product name as product information mapped to ID to each entry.

<Security>

Transmitting product information like the product name of an electronic appliance to outside, which can be received by a receiver other than the charging spot in use, may lead to the following trouble: the product name of the appliance left inside the vehicle is unjustly known by someone or personal information that the user has what kind of electronic appliance is stolen. To avoid this, it is preferable to encrypt and transmit product information of an electronic appliance.

Figure 13:
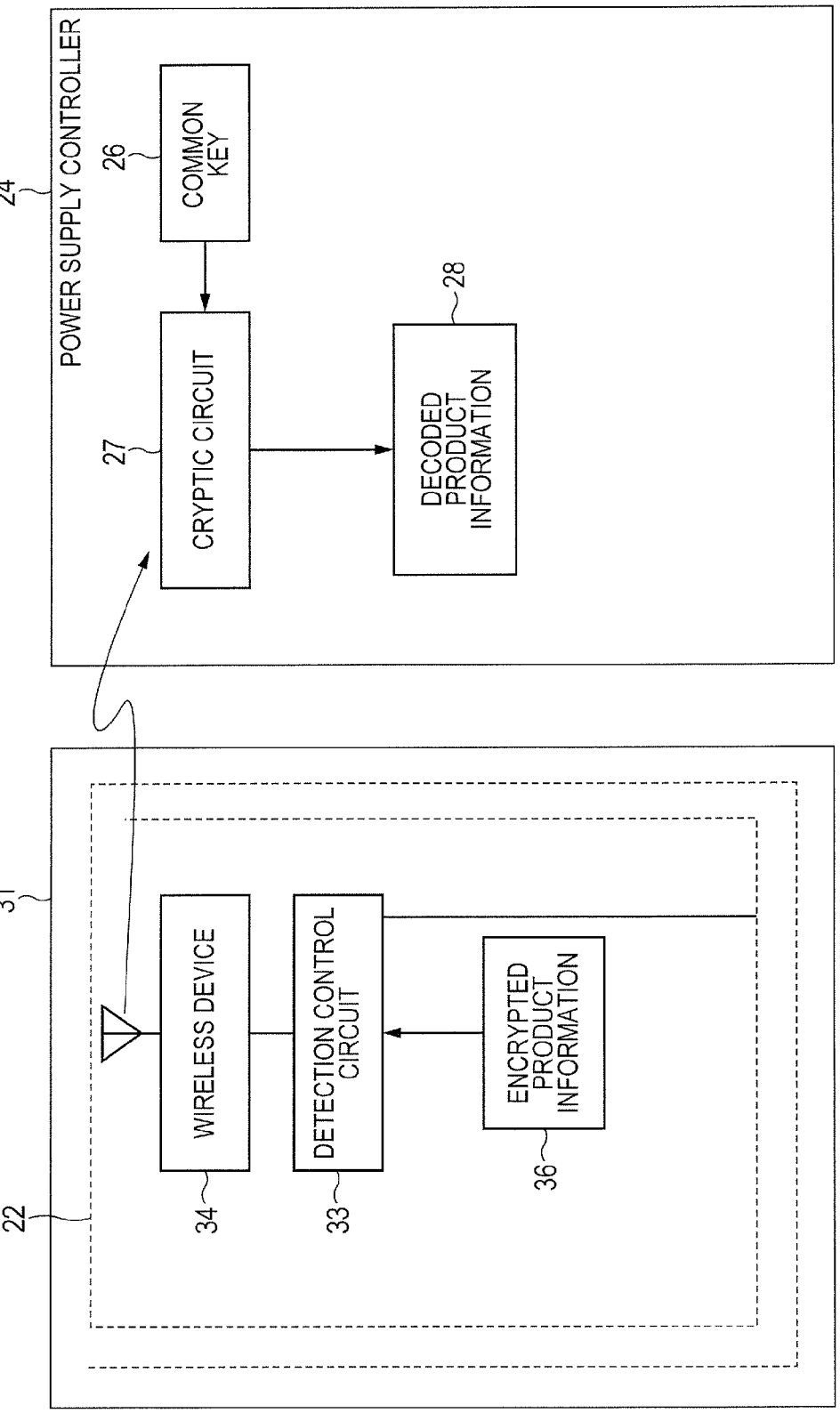
FIG. 13 is an explanatory diagram illustrating a method that uses a common key for a process for obtaining key information to decode an encrypted transmission.

There are various methods for a process for obtaining key information to decrypt an encrypted transmission. For example, a method that is illustrated in FIG. 13 can be adopted. That is, an electronic appliance 10 holds product information that has already been encrypted in a non-volatile memory 36 or the like. The appliance transmits this encrypted product information 36 via the vehicle 2 to the charging spot 3 in time with the above-mentioned precharge. At the charging spot 3, the received encrypted product information is decrypted by a cryptic circuit 27 using a common key 36. According to the decrypted product information 28, the charging spot can know what product remains left in the vehicle 2.

A method for knowing a common key that is practically used for product information is, for example, as follows. An electronic appliance 10 transmits wireless communication information (indicating its presence) that includes information which is not encrypted identifying the manufacturer of the electronic appliance 10. If the charging spot 3 is equipped with a function capable of making network connection, based on the manufacturer name information, the charging spot can obtain a common key from the site of the manufacturer of the product of consumer electronics using a secure communication environment and decrypt the product information. If the charging sport 3 is off-line equipment, a common key may be registered beforehand in the charging spot. For a secure environment that is used when accessing the manufacturer site, a secure communication, e.g., such as SSL is suitable. Description about this technology is omitted, because such technology is not related to features of the present invention.

If product information is not encrypted, a way as will be described blow may expediently be used. That is, as is illustrated in FIG. 14, it is possible to allow product information to be downloaded through authentication using an encryption key. The owner of an electronic appliance registers in advance the electronic appliance with a service provider using a specified encryption key. When initiating charging, the encryption key is transmitted from the vehicle to the charging spot. After obtaining authentication by the service provider from the charging spot using the encryption key, the charging spot downloads the product information of the electronic appliance, obtains the product information mapped to the ID included in the presence information from the downloaded product information, and uses that information for alert display.

It will be obvious that the present invention is not limited to the foregoing embodiments and various modifications may be made therein without departing from the scope of the invention.

For example, a control sequence as below may be adopted. First, control for notifying that an electronic appliance remains left in a vehicle is performed. If the electronic appliance still remains left even after the notification, power supply is controlled according to an allowable current value of the electronic appliance left in the vehicle and charging is completed.

Precharge does not mean precharging a battery and is equivalent to preliminary power supply prior to a charging operation.

Vehicles to which electricity is charged are not limited to cars and may be motorcycles or the like.

What is claimed is:

1. A non-contact power supply method that enables charging electricity to a vehicle by electromagnetically coupling a power receiving coil mounted in the vehicle to a power supply coil of a power supply device which is disposed outside of the vehicle, the non-contact power supply method comprising:
    determining that an electronic appliance is inside the vehicle, based on wireless communication information emitted by the electronic appliance inside the vehicle; and
    upon detecting that the electronic appliance is inside the vehicle, comparing respective maximum allowable current values of the detected electronic appliance and the vehicle to determine a smaller maximum allowable current value; and
    controlling a maximum current value for driving the power supply coil of the power supply device based on the smaller maximum allowable current value.

2. The non-contact power supply method according to claim 1,
    wherein the vehicle serves as an access point for the electronic appliance to communicate with a wireless communication function of the electronic appliance,
    wherein communication is established between the electronic appliance and the access point of the vehicle, and
    wherein said determining step includes receiving information from the vehicle through the communication.

3. The non-contact power supply method according to claim 1,
    wherein said determining step is a process in which, before a start of a charging operation, the power supply device performs precharging to the vehicle by means of electromagnetic coupling for a given period of time and the electronic appliance receiving electric power by the generated electromagnetic waves emits wireless communication information, and
    wherein the determining step determines whether the electronic appliance is inside the vehicle based on the emitted wireless communication information.

4. The non-contact power supply method according to claim 3, wherein said determining step includes receiving, by the power supply device, the wireless communication information via a wireless communication function of the vehicle.

5. The non-contact power supply method according to claim 3,
wherein said determining step includes directly receiving, by the power supply device, the wireless communication information.

6. The non-contact power supply method according to claim 1,
wherein said determining step includes:
receiving a predefined beacon, by the electronic appliance, which is generated inside the vehicle, and emitting, by the electronic device, wireless communication information, and
determining the electronic device is inside the vehicle based on the emitted wireless communication information.

7. The non-contact power supply method according to claim 1,
wherein said wireless communication information includes information of the allowable current value of the electronic appliance.

8. The non-contact power supply method according to claim 1,
wherein said wireless communication information includes ID information of the electronic appliance, and
wherein said determining step obtains, from the vehicle, information of the allowable current value which is obtained by referencing a database in which a mapping between the ID of the electronic appliance and the allowable current value of the electronic device has been registered.

9. A non-contact power supply system, comprising:
a vehicle including a power receiving coil disposed in the vehicle;
a power supply device including a power supply coil, which is disposed outside of the vehicle,
wherein the power receiving coil is electromagnetically coupled to the power supply coil,
wherein said power supply device comprises a power supply unit that supplies electric power to the power supply coil and a power supply control unit that controls operation of the power supply unit,
wherein said power supply control unit comprises a control function of detecting that an electronic appliance remains left inside the vehicle, based on wireless communication information emitted by the electronic appliance left inside the vehicle,
wherein said power supply control unit, upon detecting that the electronic appliance is inside the vehicle, compares respective maximum allowable current values of the detected electronic appliance and the vehicle to determine a smaller maximum allowable current value; and
controls a maximum current value for driving the power supply coil of the power supply device based on the smaller maximum allowable current value.

10. The non-contact power supply system according to claim 9,
wherein is an access point for the electronic appliance to communicate with a wireless communication function of the electronic appliance, and communication is established between the electronic appliance and the access point of the vehicle, and
wherein said power supply control unit detects that an electronic appliance remains inside the vehicle, based on wireless communication information gathered by the vehicle through the communication.

11. The non-contact power supply system according to claim 9,
wherein said power supply control unit issues a precharge command to said power supply unit before issuing a command to start a charging operation,
wherein, upon having received the precharge command, the power supply unit executes power supply from the power supply coil only for a given period of time, and
wherein an electronic appliance receiving electric power by resulting electromagnetic waves emits wireless communication information, based on which said power supply control unit detects that the electronic appliance remains in the vehicle.

12. The non-contact power supply system according to claim 11,
wherein a circuit that generates and emits wireless communication information by the electromagnetic waves is an external circuit attached to a housing of the electronic appliance and comprises a power supply antenna that receives and resonates with the electromagnetic waves and a first circuit that is supplied with power from the power supply antenna and carries out wireless communication, and
wherein said power supply control unit receives wireless communication information emitted by said first circuit via a second wireless communication circuit within the vehicle.

13. The non-contact power supply system according to claim 9,
wherein, said allowable current value is obtained, based on said wireless communication information.

14. The non-contact power supply system according to claim 9,
wherein said power supply control unit, upon detecting the electronic appliance is inside the vehicle, causes the power supply device or the vehicle to display alert information indicating the electronic appliance is inside the vehicle.

* * * * *